United States Patent
Fontana et al.

(10) Patent No.: US 12,502,733 B2
(45) Date of Patent: Dec. 23, 2025

(54) LASER CUTTING METHOD AND MACHINE

(71) Applicant: BYSTRONIC LASER AG, Niederonz (CH)

(72) Inventors: Luca Fontana, Ospitaletto (IT); Hisham Skayky, Brescia (IT); Davide Taroni, Carate Urio (IT)

(73) Assignee: Bystronic Laser AG, Niederönz (CH)

( * ) Notice: Subject to any disclaimer, the term of this patent is extended or adjusted under 35 U.S.C. 154(b) by 0 days.

(21) Appl. No.: 18/839,419

(22) PCT Filed: Feb. 9, 2023

(86) PCT No.: PCT/EP2023/053255
§ 371 (c)(1),
(2) Date: Aug. 17, 2024

(87) PCT Pub. No.: WO2023/156292
PCT Pub. Date: Aug. 24, 2023

(65) Prior Publication Data
US 2025/0114872 A1     Apr. 10, 2025

(30) Foreign Application Priority Data

Feb. 17, 2022   (EP) .................................... 22157320

(51) Int. Cl.
*B23K 26/38*     (2014.01)
*B23K 37/0533*     (2025.01)

(52) U.S. Cl.
CPC .......... *B23K 26/38* (2013.01); *B23K 37/0533* (2013.01)

(58) Field of Classification Search
CPC ................. B23B 31/101; B23B 31/302; Y10T 279/1208; Y10T 82/27
See application file for complete search history.

(56) References Cited

U.S. PATENT DOCUMENTS

| | | | |
|---|---|---|---|
| 5,522,608 A * | 6/1996 | Kitson | B23B 31/16216 279/119 |
| 6,568,694 B1 | 5/2003 | White | |
| 2015/0013145 A1* | 1/2015 | Fujiwara | B23B 31/101 29/559 |

FOREIGN PATENT DOCUMENTS

| | | | |
|---|---|---|---|
| CN | 212734223 U | * | 3/2021 |
| CN | 112658467 A | * | 4/2021 |
| CN | 112658468 A | * | 4/2021 |

(Continued)

OTHER PUBLICATIONS

Machine translation of DE 10 2012 209077 B4 into English.
(Continued)

*Primary Examiner* — Thien S Tran
(74) *Attorney, Agent, or Firm* — BelayIP

(57) ABSTRACT

The disclosure concerns a laser processing machine for processing elongate workpieces, for example tubes. The machine comprises a fixture for fixing an elongate workpiece relative to a machine part. The fixture has a pair of first clamping members and a pair of second clamping members. The first clamping members and the second clamping members each have a clamping face. The clamping members of each pair are movable in mutually opposite clamping directions towards each other to clamp the workpiece between their clamping faces. At least the first clamping members each comprise a retractable jaw that centers the workpiece, the retractable jaw being movable relative to the clamping face

13 Claims, 4 Drawing Sheets

(56) References Cited

FOREIGN PATENT DOCUMENTS

DE  10 2005 007766 B3  12/2005
DE  10 2012 209077 B4  11/2017

OTHER PUBLICATIONS

Machine translation of CN 112 658 467 A into English.
Machine translation of DE 10 2006 007766 B3 into English.
OEE Workproduct; International Preliminary Report on Patentability for PCT/EP2023/053244, mailed Nov. 27, 2023 (in English).

* cited by examiner

LASER CUTTING METHOD AND MACHINE

CROSS REFERENCE TO RELATED APPLICATIONS

This application is a national stage of international application PCT/EP2023/053255, filed Feb. 9, 2023, which claims priority to European patent application 22157320.7, filed Feb. 17, 2022, the content of both of which is herein incorporated by reference.

BACKGROUND OF THE INVENTION

Field of the Invention

The invention is in the field of laser processing machines for working elongate workpieces, such as tubes or other profiled bodies. Such laser processing machines include laser cutting machines and laser beam welding machines.

Description of Related Art

If a tube or other elongate body is subject to a laser beam working step, such as for example cutting or welding, it needs to be fixed relative to the machine that works it. To this end, for example in CN112658467A and in CN112658468A, a system with two "V"-shaped auto centering jaws is disclosed, between which the workpiece is clamped. To deal with not adjusted orientations of the workpiece, CN112658467A and CN112658468A propose spring actuated pressure plates that adjust the orientation or lateral position, respectively, of non-round workpieces before the auto centering jaws adjust their position. The approach of CN112658467A and in CN112658468A has the disadvantages that the shape of the jaws needs to be adapted to the shape of the workpiece to at least some extent, and that a blocking situation may result if the lateral centering or orientation, respectively, is not appropriate. For example, if the jaws are used to fix an elliptical tube, the contact between the jaws and the tube is constrained to two contact lines with a correspondingly high local contact pressure. In such a set-up, possible problems may arise if the workpiece is not perfectly laterally aligned and oriented when the jaws are closed upon it. When it touches the jaws in two spots, it can get stuck and block the complete closing of the jaws.

DE102012209077B4 concerns a clamping device for rod-like workpieces. The clamping device has several units, each comprising a clamping jaw. The clamping jaws are mounted relative to hydraulic cylinders that themselves are movable relative to pneumatic cylinders. The closing movement of the four clamping jaws upon the workpiece to be held is synchronous and is caused by compressed air via the pneumatic cylinders. The purpose of the hydraulic cylinders is that valves can couple the hydraulic fluid for opposing clamping jaws so that when an eccentricity of the workpiece forces the jaws sideways, the sideways movement is synchronous, and the clamping force remains constant. The mechanism with the hydraulic and pneumatic cylinders does not act to center the workpiece but to handle eccentricity.

BRIEF SUMMARY OF THE INVENTION

It is an object of the present invention to provide laser processing machine for laser processing elongate workpieces, the laser processing machine having a fixture for fixing the elongate workpiece relative to a machine part. The laser processing machine is to overcome drawbacks of prior art machines, and is especially suitable for processing elongate workpieces, especially tubes, of different cross sections.

An elongate workpiece is a workpiece whose extension in one dimension (along an axial direction) is much greater, for example by at least a factor 4, than the extensions in dimensions orthogonal thereto. In many embodiments, the workpiece may be a tube or other profile having, at least in regions, a constant profile along the axial direction.

Especially, it is an object of the invention to provide a laser processing machine having fixture suitable for fixing elliptic tubes relative to a machine part.

According to an aspect of the invention, laser processing machine comprises a fixture, the fixture comprising a pair of first clamping members and a pair of second clamping members. The clamping members of each pair are movable in mutually opposite clamping directions towards each other to clamp the workpiece between clamping faces of the clamping members. The clamping directions of the second clamping members are transverse, especially orthogonal, to the clamping directions of the first clamping members. At least the first clamping members each comprise a retractable jaw, the jaw being movable relative to the respective clamping face of the clamping member to which the retractable jaw belongs.

The laser processing machine may especially be a laser cutting machine or laser welding machine for cutting/welding tubes as the workpieces, the machine especially being equipped for cutting/welding elliptical tubes, possibly in addition to other workpieces.

The retractable jaws may especially be pressed inwardly (radially inwardly; towards an axis), against a stop and be displaceable relative to the clamping face against a spring force. The retractable jaw may especially be mounted on a surface of a clamping member main body, which surface is radial and may lie orthogonally to the axis. Thus, the axial position of the engagement face of the retractable jaw may be offset with respect to the axial position of the clamping face. By having the retractable jaw, the clamping member thus is somewhat thicker (larger axial extension) than it could be if it did not have the retractable jaw.

In order for the retractable jaw to have a defined and constant orientation, the retractable jaw may be guided relative to the clamping jaw main body by two parallel, rail-like guiding elements. For example, the retractable jaw may comprise two grooves or slots into which dedicated studs of the main body engage, or vice versa.

The retractable jaws may have an engagement surface that is shaped to receive an elliptic or round profile in a centering manner.

The engagement surface of each jaw is thus concave in the mathematical sense (with the surface being curved or flat). When the workpiece is received in the receiving region formed by the retractable jaw, it is thereby confined in the two lateral directions, whereby the engagement surface is centering.

Especially, the retractable jaws may have two inclined centering portions that are at an acute angle (non-zero and less than 90°) to the plane that is normal to radial directions. Thus, the engagement surface can be approximately V-shaped or C-shaped or U-shaped. The acute angle in this may especially be between 15° and 35°, this range proving to be beneficial for accommodating elliptic profiles of different ellipticities and sizes. More in general, the angle may be between 10° and 45°, and specifically it may be between 18° and 28°.

Thus, the function of the retractable jaws may be to appropriately align/position the workpiece relative to the fixture in an initial stage. The clamping faces of the clamping members act to clamp the workpiece when the retractable jaws are retracted, especially after the clamping force acting between the clamping members has been raised. To this end, the retractable jaws are positioned to hold the workpiece between them until the clamping faces get into contact with the workpiece, i.e., the clamping members are equipped for the clamping faces to get into contact with the workpiece while the workpiece is held by their retractable jaws.

In embodiments, this is by done by increasing the clamping force (the pressing force by which the clamping members are pressed towards each other, against the workpiece between them) and moving the clamping members towards each other until the clamping faces get into contact with the workpiece. For example, if the clamping members comprise a spring that biases the retractable jaws towards the workpiece, then the clamping faces get into contact with the workpiece if the clamping force is high enough to overcome the spring force at the position in which the retractable jaw is pushed by relative to the clamping face far enough for the clamping face to get into contact with the workpiece.

Thus, in many embodiments, the force, by which the workpiece is clamped, is substantially lower in an initial stage when the clamping jaws act on it but there is no physical contact between the clamping faces and the workpiece, and it is substantially higher as soon as the workpiece is held between the clamping faces.

In embodiments, the clamping faces of the first clamping members and/or of the second clamping members are flat in the sense that they have an essentially constant cross section along their width (symmetry with respect to translations in the transverse direction), whereby an adjustment of the transverse position (for example by the second pair of clamping members) encounters comparably less resistance when the workpiece is being clamped (for example by the first pair of clamping members).

In embodiments, the fixture further comprises a blocking system to block the retractable jaw in the retracted position. Such blocking system may for example be used if a workpiece having a rectangular profile or other profile for which the retractable jaws are not useful, is to be fixed. It may comprise a jamming mechanism jamming the retractable jaw against the main body.

In embodiments, not only the first clamping members but also the second clamping members each comprises a retractable jaw.

The fixture may in addition to comprising the clamping members also comprise a mechanism for moving the clamping members, for example a pneumatic drive. A control module of the fixture controls the movements of the clamping members. The control module in this may be a dedicated separate control module or may be integrated in a machine control of the entire machine or a machine module thereof.

The control module may be equipped to first apply a first, small clamping force between the first clamping members and to maintain this first clamping force when the second clamping members close on the workpiece, so that lateral movements of the workpiece are not impeded by a too high clamping force. After the closing of the second clamping members has been effected, the control module may cause a second, higher clamping force to be applied to the first clamping members.

The fixture may be mounted on a machine part or belong thereto, which machine part is rotatable. Especially, the fixture may belong to a rotatable mandrel.

The laser processing machine in addition to comprising the fixture also comprises a laser source and possibly a radiation guide for guiding the radiation from the laser source to a radiation emitting laser head, wherein the machine is configured to cause radiation generated by the laser source to impinge on the workpiece fixed by the fixture.

The laser processing machine may further comprise a sensor system to check the correct alignment of the workpiece when fixed by the fixture. A correction routine programmed in the machine control may apply a correction of the positioning is found to be insufficient. To this end, the machine may rotate the workpiece for checking the alignment/positioning and/or for correcting. Correcting the alignment/position may include the temporary release of the clamping force acting on the pair of first clamping members and/or on the pair of second clamping members and the re-applying of this clamping force(s), possibly after a rotation step and/or further position adjustment step.

BRIEF DESCRIPTION OF THE SEVERAL VIEWS OF THE DRAWINGS

Hereinafter, embodiments of the present invention are described with reference to drawings. In the drawings, same reference numbers refer to same or similar components, wherein.

DETAILED DESCRIPTION OF THE INVENTION

Figure 1:
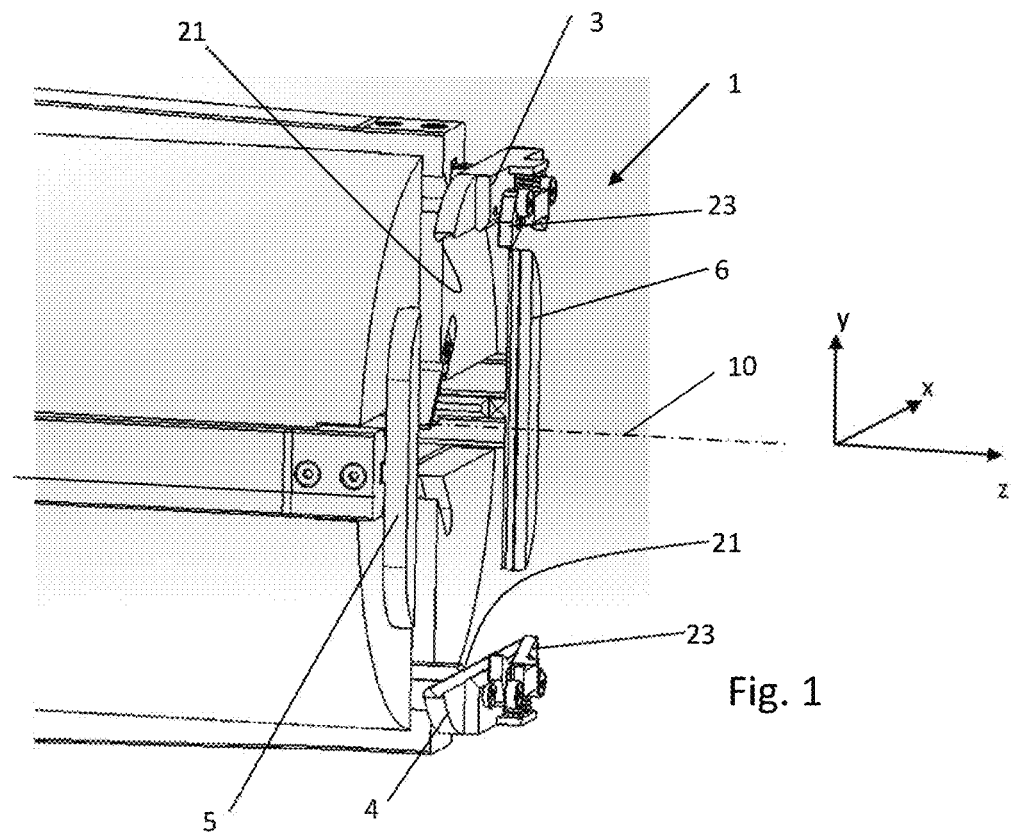
FIG. 1 depicts a perspective view on a mandrel comprising a fixture.

FIG. 1 shows a perspective view on a mandrel comprising a fixture 1 for fixing a workpiece to a stationary or not stationary part of a laser processing machine, for example a laser tube cutting machine. The fixture comprises a pair of first clamping members 3, 4 and a pair of second clamping members 5, 6. The second clamping members 5, 6 are offset with respect to the first clamping members 3, 4 with respect to an axial direction (axis 10). The fixture is equipped for the clamping members of each pair to be moved towards each other in a radial direction so as to clamp a workpiece between them. In this, the workpiece will mostly be an elongate workpiece, with a workpiece longitudinal axis aligned to the axis 10 of the fixture.

The drive for moving the clamping members of each pair may be a pneumatic drive. The movement of the two clamping members 3, 4; 5, 6 of each pair may be coupled or may be individually controllable, whereas the pairs of clamping members function independently of each other.

FIG. 1 also shows a Cartesian coordinate system, with the axis being parallel to the z-direction, z-directions also being called the "axial directions" in the present text.

The entire fixture 1 may be provided on rotatable machine part or alternatively on a stationary machine part. In the depicted embodiment, the whole mandrel is rotatable. The coordinate system in the present text is assumed to be defined relative to the fixture, i.e., when the mandrel is rotated, so is the coordinate system.

Figure 2:
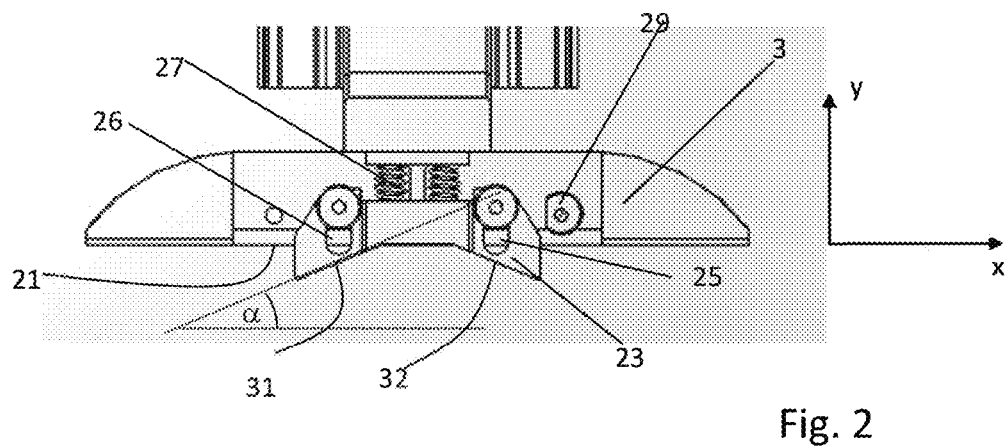
FIG. 2 depicts a view of a clamping member with retractable jaw.

FIG. 2 shows one of the first clamping members 3. The first clamping member 3 has a clamping face 21, which may be structured, for example toothed and/or profiled so that the contact between the clamping face and the clamped workpiece need not be, dependent on the structure of the workpiece, a 2D-area but may be restricted to one or more contact lines or contact points. It is also possible that the clamping face comprises elastic material so that the shape adapts to some extent to the shape of the workpiece.

Especially, the clamping face 21 may be constant with respect to translations into the transverse (x-) directions, as becomes visible for the lower clamping member 4 in FIG. 1.

The first clamping member 3 comprises a retractable jaw 23. The retractable jaw 23 is movable relative to a clamping member main body (with the clamping face 21) in a radial direction. To define the possible movement direction and limits, it has two guiding slots 25 into which guiding studs 26 of the clamping member main body 22 engage. The guiding slots define the orientation of the retractable jaw 23 relative to the main body 22, for example together with a further guiding means, which is illustrated to be arranged between a pair of springs 27 in FIG. 2. The pair of springs 27 press the retractable jaw towards radially-inward against a stop formed by one end of each guiding slots.

The retractable jaw 23 has an engagement surface, which, similar to the clamping face 21 but independently thereof, may be structured or consist of flat surface portions. The engagement surface especially has two inclined centering portions 31, 32 at an angle to the plane that is orthogonal on the radial direction, the centering portions 31, 32 facing inwardly. Thereby, the engagement surface has an overall V-shape. As an alternative to the centering portions 31, 32 being straight, as shown in the depicted embodiment, other shapes of the engagement surface would be possible, for example a continuously curved shape (c-shape).

Figure 4:
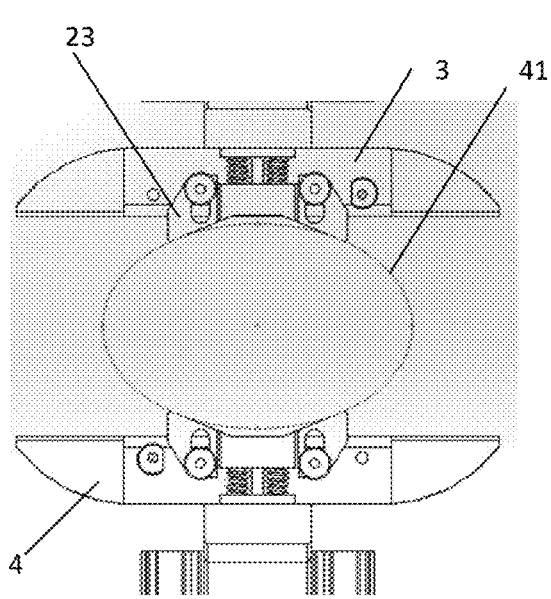
FIGS. 4 and 5 depict the first pair of clamping members during two different stages of the closing process.

The engagement surface, by having centering portions facing each other, forms a region for any workpiece having an elliptic or round cross section as is illustrated for example in FIGS. 4 and 5 described hereinafter.

The angle formed by the two inclined centering portions 31, 32 of the engagement surface is optimized for centering elliptical profiles of different sizes and ellipticities. Especially, the angle α between the inclined centering portions and the plane perpendicular to the radial direction may be between 10° and 45°, especially between 15° and 35°, for example between 18° and 28°.

Figure 3:
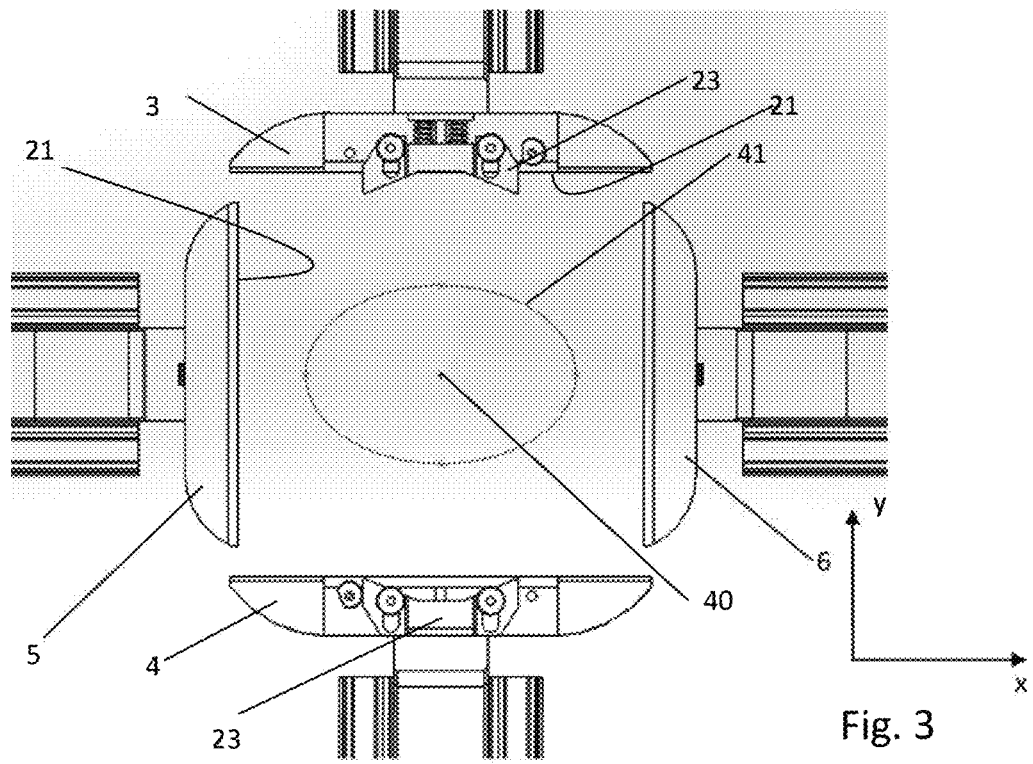
FIG. 3 depicts view of two pairs of clamping members.

FIG. 3 schematically illustrates, in cross section, a workpiece 41 being an elliptic tube, the tube axis 40 extending perpendicular to the drawing plane. In FIG. 3, the retractable jaw 23 of the upper first clamping member 3 is shown in the extended position (no external forces acting on the clamping member 3), whereas, for illustration purposes, the retractable jaw 23 of the lower first clamping member 4 is shown in the retracted position, with no springs 27 being shown.

When a workpiece is to be fixed, initially the pair of first clamping members 3, 4 closes on the workpiece by being moved towards each other in opposite directions (the y- direction and the -y-direction, respectively). The force of the springs 27 is calibrated in the way that the retractable jaw 23 can align the elliptical profile at the first contact. This is illustrated in FIG. 4. Thereafter, the pressing force on the first clamping members 3, 4 is increased until the clamping face 21 gets into physical contact with the workpiece, and the workpiece is clamped between the first clamping members 3, 4 (FIG. 5).

Thereafter, the pair of second clamping members 5, 6 closes on the workpiece from laterally (referring to the orientation shown in the figures), i.e., by being moved towards each other in opposite directions (the x- direction and the -x-direction, respectively), the directions of their movements being perpendicular to the movement directions of the pair of first clamping members. The shape of the surface of the clamping faces 21 of the first clamping members 3,4, for example the shape of teeth that form the clamping face 21, is made in the way that a lateral movement of the workpiece is still possible in a way that the pair of second clamping members 5, 6 can center it also with respect to lateral directions for example by the surface of the clamping faces having the mentioned property of being constant with respect to translations into the transverse (x-) directions.

Figure 5:
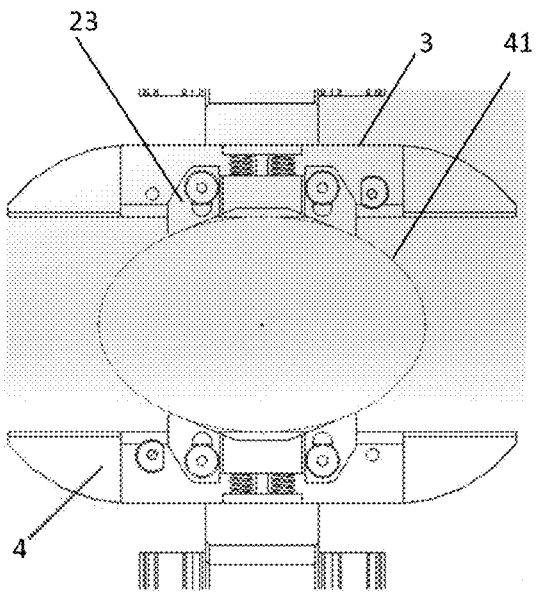
Figure 6A:
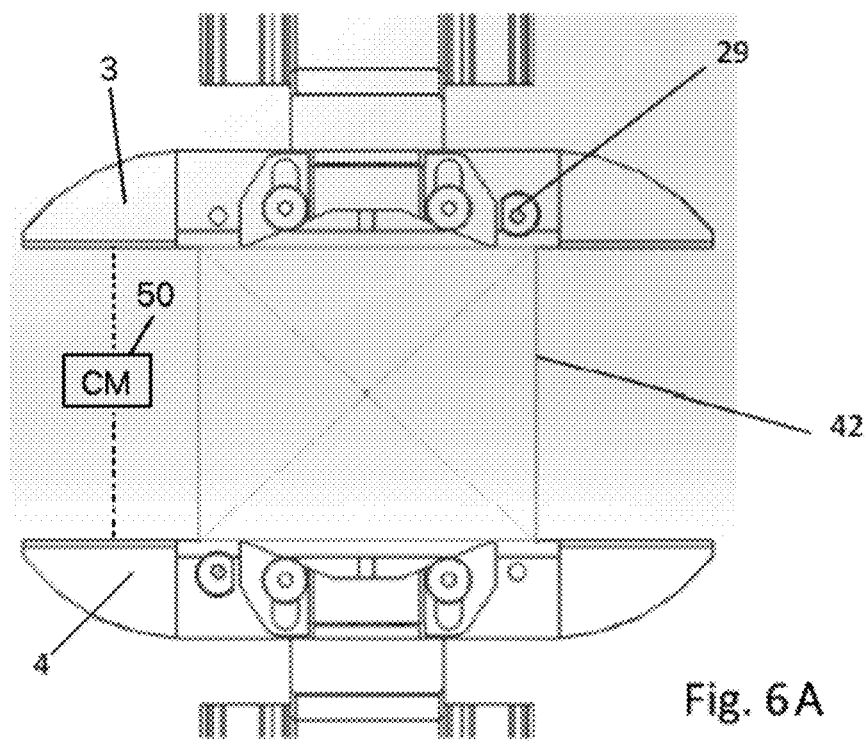
FIG. 6A and 6B depict the first and second pair of clamping members.
Figure 6B:
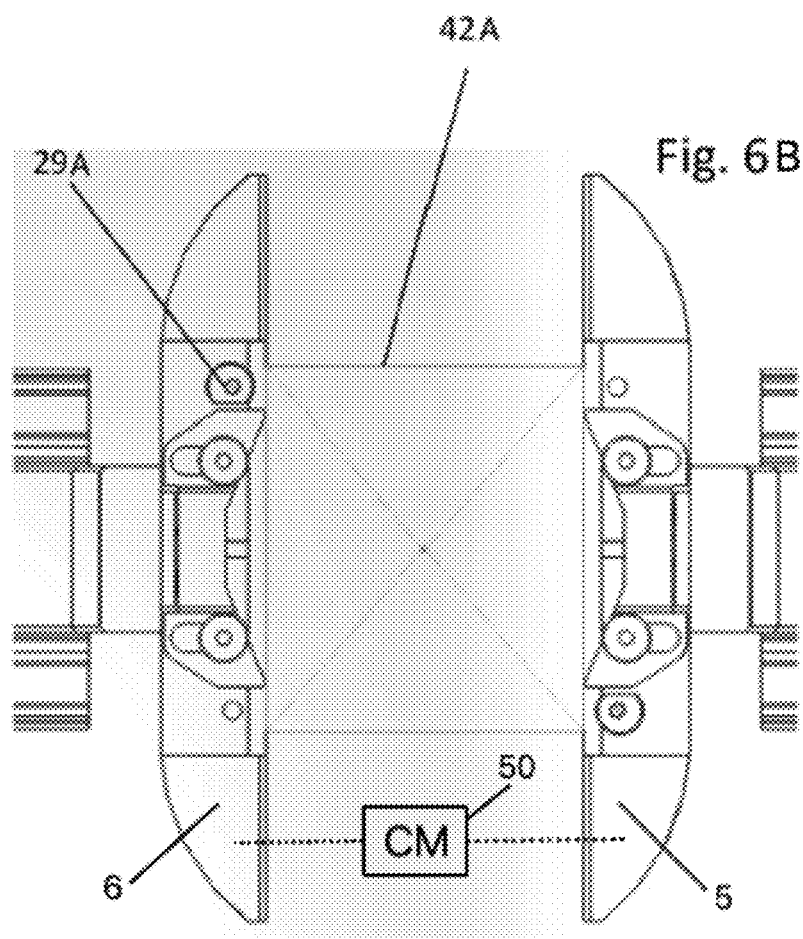

FIG. 6A and 6B illustrate the fact that if a workpiece having a non-elliptic profile is fixed, the retractable jaws 23 touch the workpiece and then go to the compressed position in the way that at the end the final position of the profile is not affected by the presence of the retractable jaws (FIG. 5). In this way, it is not necessary to replace the clamping members or remove the retractable jaws when there is a change of production. FIGS. 6A and 6B further depict control module 50 (not to scale) in communication (as shown via dashed lines) with the clamping members 3. 4, 5 and 6. Turning knob 29 and 29A are also depicted.

Figure 7:
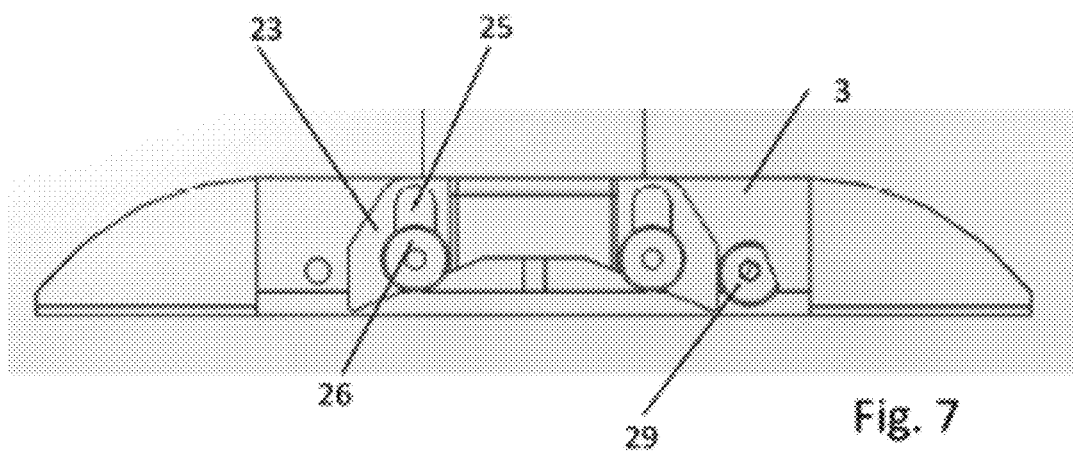
FIG. 7 depicts a first clamping member.

As can for example be seen in FIG. 7, the first clamping members 3, 4—or generally those clamping members that comprise a retractable jaw—may comprise an optional blocking system so as to fast block and release the retractable jaws 23 from the retracted position. In the illustrated embodiment, the blocking system comprises eccentric turning knob 29 and 29A that depending on its orientation blocks the retractable jaw 23 or releases it (release position: see for example FIG. 6).

Further optional features include retractable jaws also on the second clamping members.

For example if also the second clamping members 5, 6 have retractable jaws—but not only then—the machine may be equipped to apply a first clamping force between the pair of first clamping members before the pair of second clamping members closes on the workpiece, and to increase the clamping force to a second clamping force thereafter. In this way, by having the initial, reduced first pressing force, the workpiece is to some degree movable when the pair of second clamping members closes on it so that an adjustment of its alignment—for example of its exact lateral position and also of its orientation around the axis 10 and/or alignment with the axis—encounters less mechanical resistance.

The pressing force of the clamping members may be applied by a pneumatic system or alternatively by an electric drive with a mechanical transmission or in any other suitable way.

An even further optional feature of the invention includes the use of a suitable sensor system—for example including an optical sensor, such as a camera—to check the alignment of the workpiece and a correction, which for example may include a rotation of the mandrel, so as to increase the precision of the positioning. If this optional feature is implemented, a control software of the machine that has the fixture may be used to interpret the data from the sensor system and to initiate, if necessary, the correction step or correction steps in a control cycle. It is, however, also possible to use a dedicated separate software tool for this.

The scope of protection of the present invention is given by the claims and is not limited by the features illustrated in the description or shown in the figures.

What is claimed is:

1. A laser processing machine for processing an elongate workpiece, the machine comprising:
    a fixture configured to fix the elongate workpiece relative to a machine part, the fixture comprising a pair of first clamping members and a pair of second clamping members, wherein each of the first clamping members comprises a retractable jaw, the first clamping members and the second clamping members each have a clamping face, each of the first clamping members and each of the second clamping members comprising clamping faces and configured to move in mutually opposite clamping directions towards each other to clamp the workpiece between the clamping faces, and
    at least each of the first clamping members comprise a retractable jaw configured to move relative to the clamping face, and
    wherein each of the first clamping members comprise at least one spring, and
    wherein the retractable law of each first clamping member is configured and arranged to retract relative to the clamping face radially outwardly against a spring force of the at least one spring.

2. The laser processing machine according to claim 1, wherein each retractable jaw comprises an engagement surface configured to accommodate a round or elliptic profile of the workpiece in a centering manner.

3. The laser processing machine according to claim 1, wherein each retractable jaw comprises an engagement surface comprising two inclined centering portions arranged at an angle to a plane that is orthogonal to radial directions, the centering portions facing inwardly.

4. The laser processing machine according to claim 3, wherein an angle between the inclined centering portions and the plane perpendicular to the radial direction is between 15° and 35°.

5. The laser processing machine according to claim 1, further comprising a blocking system configured to block each retractable jaw in a retracted position.

6. The laser processing machine according to claim 1, wherein each of the first clamping members and each of the second clamping members comprise a retractable jaw.

7. The laser processing machine according to claim 1, further comprising a control module configured to control movements of the first and second clamping members, the control module programmed to initiate, for fixing the workpiece relative to the machine part, a closing movement of the first clamping members first and to initiate a closing movement of the second clamping members thereafter.

8. The laser processing machine according to claim 7, wherein the control is equipped to apply a first clamping force between the first clamping members, to thereafter initiate the closing movement of the second clamping members, and to then increase the clamping force between the first members to a second clamping force, higher than the first clamping force.

9. The laser processing machine according to claim 1, wherein clamping directions of the first clamping members are perpendicular to clamping directions of the second clamping members.

10. The laser processing machine according to claim 1, wherein the laser processing machine is a laser cutting machines configured to cut tubes.

11. The laser processing machine according to claim 1, wherein the fixture is a rotatable mandrel.

12. The laser processing machine according to claim 1, further comprising a sensor system configured and arranged to check an alignment of the workpiece relative to the machine part, and wherein a machine control is programmed to carry out a correction routine.

13. The laser processing machine according to claim 12, wherein the correction routine comprises rotating the workpiece, releasing a clamping force upon at least one of the pairs of clamping members, and re-applying a clamping force upon the clamping members.

\* \* \* \* \*